United States Patent [19]

Ohmori

[11] Patent Number: 4,657,280
[45] Date of Patent: Apr. 14, 1987

[54] SYSTEM FOR CONTROLLING THE DAMPING RATE OF A VEHICLE SUSPENSION

[75] Inventor: Taiji Ohmori, Saitama, Japan

[73] Assignee: Honda Giken Kogyo Kabushiki Kaisha, Tokyo, Japan

[21] Appl. No.: 665,592

[22] Filed: Oct. 25, 1984

[30] Foreign Application Priority Data

Oct. 27, 1983 [JP] Japan ................... 58-201436

[51] Int. Cl.$^4$ ............................................. B60G 21/00
[52] U.S. Cl. ................................... 280/707; 280/688
[58] Field of Search ....................... 280/6.1, 6.11, 707, 280/6 H, 688

[56] References Cited

U.S. PATENT DOCUMENTS

| | | | |
|---|---|---|---|
| 4,015,859 | 4/1977 | Hegel | 280/707 |
| 4,310,172 | 1/1982 | Claude et al. | 280/707 |
| 4,382,603 | 5/1983 | Senoo | 280/707 |
| 4,402,375 | 9/1983 | Glaze | 280/707 |
| 4,402,527 | 9/1983 | Kakehi et al. | 280/707 |
| 4,422,661 | 12/1983 | Kawamura | 280/707 |

Primary Examiner—Richard A. Bertsch
Attorney, Agent, or Firm—Armstrong, Nikaido, Marmelstein & Kubovcik

[57] ABSTRACT

A control system for controlling the adjustable damping rate of a suspension in a vehicle dependent on a road condition. The control system includes a detector for detecting a vibration acceleration of the vehicle, and a control means for controlling the suspension in response to information on the vibration acceleration from the first detector. The control system can automatically control the suspension quickly and reliably.

4 Claims, 3 Drawing Figures

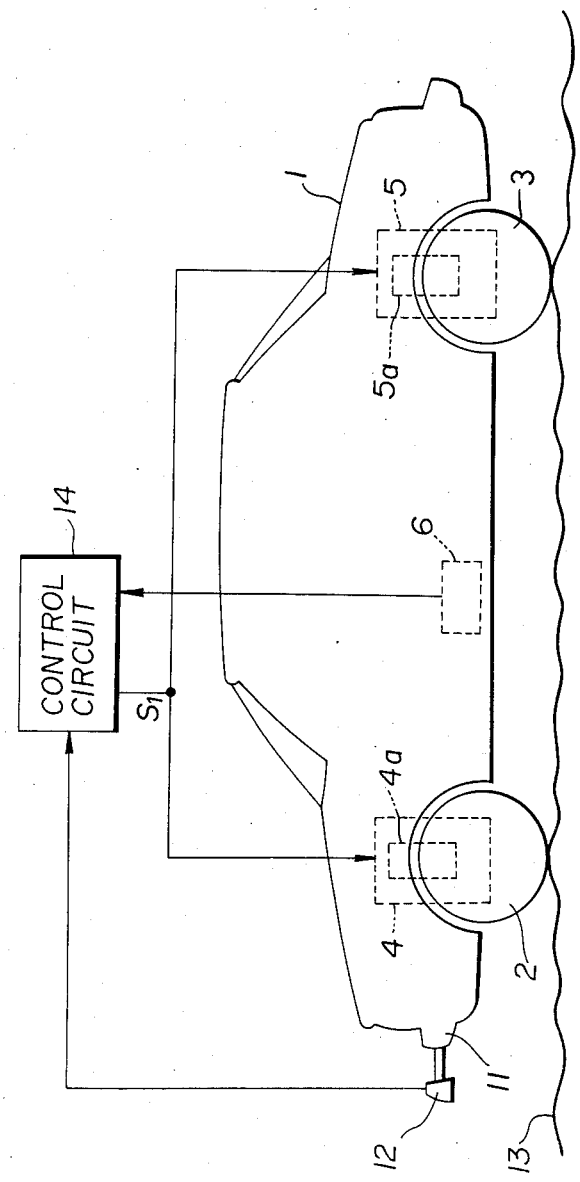

SYSTEM FOR CONTROLLING THE DAMPING RATE OF A VEHICLE SUSPENSION

BACKGROUND OF THE INVENTION

1. Field of the Invention

The present invention relates to a system for controlling the adjustable damping rate of a vehicle suspension.

2. Description of the Prior Art

There is known a shock absorber with an adjustable damping rate for use in a vehicle suspension. The vehicle suspension with such a shock absorber can match its characteristics to a road condition by adjusting the damping rate of the shock absorber (and hence the suspension itself) according to the road condition. However, the known vehicle suspension is disadvantageous in that the damping rate thereof cannot be adjusted to meet rapidly varying road conditions while the vehicle is running.

SUMMARY OF THE INVENTION

The present invention has been made in an attempt to solve the above conventional problem.

It is an object of the present invention to provide a control system for quickly adjusting the damping rate of a vehicle suspension to meet varying road conditions.

Another object of the present invention is to provide a control system for automatically adjusting the damping rate of a vehicle suspension.

Still another object of the present invention is to provide a control system for effecting automatic damping rate adjustment with high reliability.

According to the present invention, a system for controlling the adjustable damping rate in a suspension on a vehicle dependent on a road condition includes a detector for detecting a vibration acceleration of the vehicle, and a control means for controlling the suspension in response to information on the vibration acceleration from the detector.

According to a preferred embodiment of the present invention, a system for controlling the damping rate of a suspension on a vehicle includes a first detector for detecting a vibration acceleration of the vehicle, a second detector adapted to be mounted on a front portion of the vehicle for detecting a bumpy condition of a road on which the vehicle runs, and a control means for controlling the suspension in response to information on the vibration acceleration from the first detector and information on the bumpy condition which is produced by differentiating an output signal from the second detector.

The above and further objects, details and advantages of the present invention will become more apparent from the following detailed description of a preferred embodiment thereof, when read in conjunction with the accompanying drawings.

BRIEF DESCRIPTION OF THE DRAWINGS

FIG. 1 is a schematic view of a control system according to a preferred embodiment of the present invention, the control system being incorporated in a motor vehicle;

DESCRIPTION OF THE PREFERRED EMBODIMENTS

As shown in FIG. 1, an automobile 1 has front and rear wheels 2, 3 supported respectively by suspensions 4, 5 including respective shock absorbers 4a, 5a (shown schematically) having adjustable damping rates.

Figure 3:
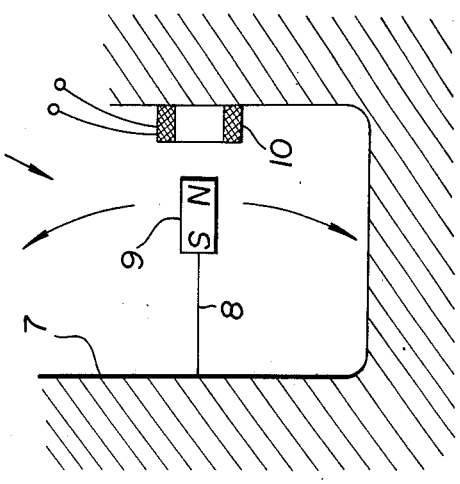
FIG. 3 is a cross-sectional view of a vibration acceleration detector in the control system of FIG. 1.

A detector 6 for detecting a vibration acceleration is mounted on the automobile 1 in the vicinity of a center thereof. The detector 6 is illustrated in detail in FIG. 3, and has a magnet 9 attached by a leaf spring 8 to a automobile body 7 with the magnet 9 acting as a weight, and a magnetic detector element 10 comprising a coil disposed in confronting relation to an N pole of the magnet 9 and in a substantially central position of a vertical interval which the magnet 9 vibrates vertically. When the body 7 of the automobile 1 vibrates vertically, the magnet 9 also reciprocably vibrates vertically with the body 7. The flux of the magnet 9 acts on the magnetic detector element 10 which then detects the acceleration of the vibration.

According to the present invention, it is preferable to provide a detector 12 on a front bumper 11 of the automobile 1 for detecting a bumpy condition of the road 10 on which the automobile 1 runs. The detector 12 comprises a non-contact type detector such as for detecting the distance between the detector 12 and a road surface directly therebelow based on a phase difference between reflected waves such as electromagnetic waves, light, ultrasonic waves, or the like.

A control circuit 14 is supplied with detected signals from the detectors 6, 12, processes the supplied signals, and issues a control signal to the suspensions 4, 5 to adjust the damping rates of the suspensions 4, 5.

Figure 2:
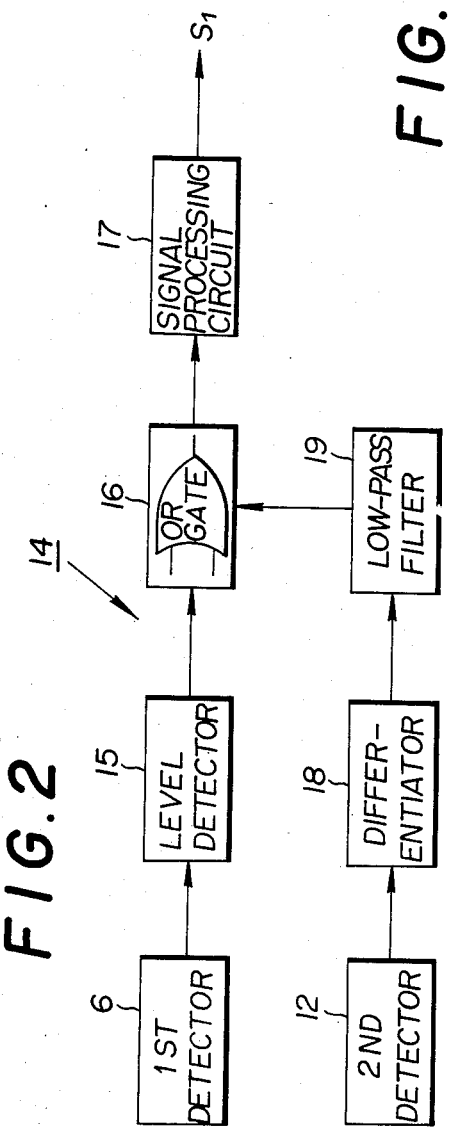
FIG. 2 is a block diagram of a control circuit in the control system shown in FIG. 1.

In FIG. 2, an output signal from the vibration acceleration detector 6 is applied to a level detector 15 which detects acceleration above a certain level. An output signal from the level detector 15 is applied to an input terminal of an OR gate 16 and delivered therethrough to a signal processing circuit 17. The signal processing circuit 17 is responsive to supplied information on the vibration acceleration detected by the detector 6 for issuing a control signal $s_1$ for adjusting the damping rates of the shock absorbers 4a, 5a of the suspensions 4, 5.

The control system of the above arrangement for the suspensions controls the suspensions primarily based on the detected signal from the detector 6 which is indicative of the vibration acceleration of the automobile body 7.

The detector 12 on the front bumper 11 is capable of producing information on the bumpy condition of a road surface ahead of the automobile 1. A detected signal from the detector 12 is applied to a differentiator 18. The signal from the detector 12 is a voltage signal varying dependent on the bumpy condition of the road 13. By differentiating the voltage signal from the detector 12, the differentiator 18 generates a signal indicative of information on the degree of the bumpy condition of the road, or the degree of a slope of the road.

The output signal from the differentiator 18 is passed through a low-pass filter 19 which removes high-frequency components, and a signal from the low-pass filter 19 is applied to the other input terminal of the OR gate 16. The signal issued from the OR gate 16 will be processed in the manner described above. Therefore, the suspensions 4, 5 can also be controlled by the signal from the detector 12.

Since the degree of the bumpy condition of the road 13 ahead of the automobile 1 and the vibration acceleration of the automobile body while it is running are correlated, the output signal from the detector 12 may additionally be used as a predictive signal. More specifically, before the front wheels 2 of the automobile 1 are affected by any change in the road condition, the suspensions 4, 5 can be controlled by the output signal from the detector 12 so as to change their characteristics in advance to meet the change of the road condition.

In detecting the bumpy condition of the road with the detector 12, the output signal from the detector 12 contains an initial error, a time-dependent drift, and other errors, which will be accumulated to result in an error equivalent to a large displacement of the suspensions. However, in the illustrated embodiment, the signal representative of the bumpy road condition is differentiated to produce a signal indicative of the degree of the bumpy road condition relatively easily with a good accuracy. Even when an error signal is produced from the detector 12 due to noise or the like, such an output signal is temporary and does not affect the operation of the control system.

The low-pass filter 19 may be provided or may be dispensed with.

With the present invention, as described above, the vibration acceleration of the vehicle is detected, and the damping rate of each suspension is adjustably controlled on the basis of the detected vibration acceleration. Accordingly, the suspensions can quickly and reliably be controlled automatically.

The detector for gaining information on a road condition ahead of the vehicle is of an additional advantage since it can control the suspensions before any change in the road condition affects the vehicle.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A system for controlling the adjustable damping rate in a suspension on a vehicle dependent on a road condition, comprising:
    (a) a first single detector disposed in the vicinity of the center of the vehicle for detecting a vertical vibration acceleration of the vehicle and emitting a signal corresponding to said vibration accelaration; and
    (b) control means for controlling the suspension in response to the signal from said first single detector.

2. A system according to claim 1, further including a second detector adapted to be mounted on a front portion of the vehicle for detecting a bumpy condition of a road on which the vehicle runs, said control means controlling the suspension in response to information on the vibration acceleration from said first detector and information on the bumpy condition which is produced by differentiating an output signal from said second detector.

3. A system according to claim 2, wherein said second detector comprises a detector for detecting a distance between the detector itself and a road surface directly below said detector.

4. A system as claimed in claim 1, wherein said first detector uses magnetic flux to detect vibration acceleration.

* * * * *